Dec. 16, 1930.  C. H. O. LUBECK  1,785,202
ELECTRIC ACCUMULATOR
Filed Oct. 21, 1925
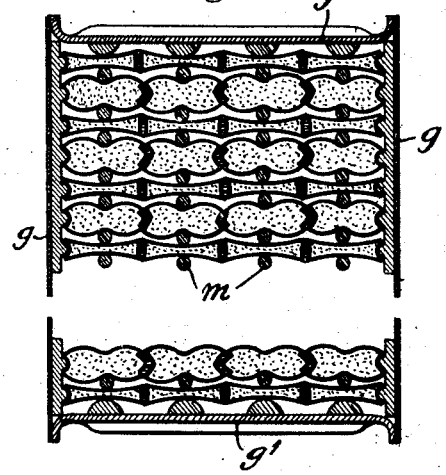
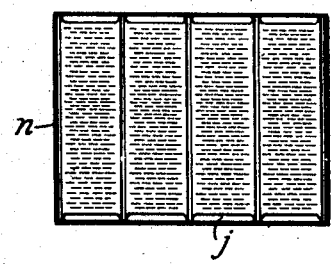
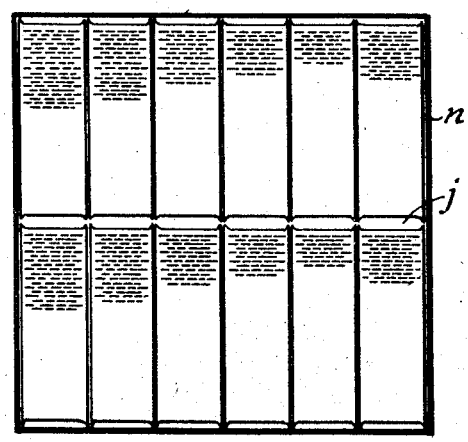
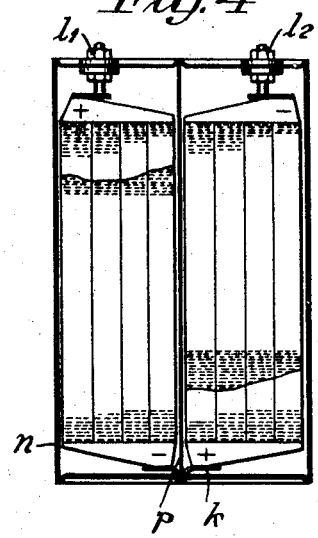
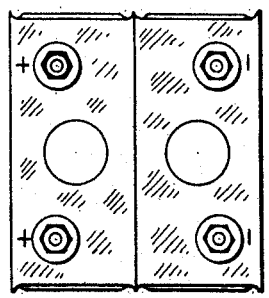
C. H. O. Lubeck
INVENTOR
By: Marks & Clerk
Attys Patented Dec. 16, 1930

1,785,202

UNITED STATES PATENT OFFICE

CARL HILDING OSSIAN LUBECK, OF STOCKHOLM, SWEDEN

ELECTRIC ACCUMULATOR

Application filed October 21, 1925, Serial No. 63,982, and in Sweden October 31, 1924.

This invention relates to alkaline storage batteries of the kind in which the positive electrodes each are made up of a number of perforated sheet-metal receptacles filled with active material consisting preferably of oxygen compounds of nickel mixed with metallic nickel, for instance in the form of thin flakes, or with graphite or other suitable conducting substances. On account of the reactions occurring in the active material when this is brought into contact with the electrolyte as well as during the charging and discharging of the battery the said active material is subjected to considerable changes in volume, as the material expands during the charging of the battery and contracts during the discharge.

If the receptacles, as is generally the case, are made of thin sheet-metal the walls of the receptacles will tend to bulge out upon being subjected to the interior pressure caused by the expanding substance. If no steps are taken in order to counteract or prevent such a bulging out of the metal receptacle its volume will increase and the casing will be deformed. When the substance again contracts it might happen that the metal casing does not return to its normal shape, in which case the inner pressure in the substance or the pressure of particles in the mass against each other and against the metal casing will be decreased.

However, such a decrease of the pressure in the mass has an unfavourable effect upon the electric conductivity of the mass, which will be decreased in correspondence with the decrease of the pressure. A bad conductivity of the substance is, however, as known, of unfavorable influence on the operation of the battery, for which reason there is a general tendency when constructing storage batteries to impart a good conductivity to the material and to counteract any reduction thereof. To this end several attempts have been made in order to prevent the bulging out or deformation of the metal receptacles at the expansion of the material, for instance by giving said receptacles a cylindrical or tubular shape, which, if desired, may be reinforced by thrusting-on rings preferably of steel. However, in this case other inconveniences occur. For instance, a greater space is required for taking up a certain number of electrodes of this kind than in the case of using electrodes in which the active material is enclosed between sheet-metal plates forming flat or substantially flat receptacles.

The present invention especially relates to storage batteries with electrodes of the kind as last mentioned and has for its object to provide means to prevent deformation of the electrodes. According to the invention the positive and negative electrodes together with intermediate spacing members of insulating material are assembled into groups each of which is surrounded by a pressing device comprising a pair of press plates bearing against the outermost electrodes of the group and connected with one another by longitudinal anchoring members adapted to take up, through the medium of the spacing members and the press plates, the pressure produced by the tendency of swelling of the active material.

Other features of the invention will be described below in connection with the detailed description with reference to the annexed drawing in which Fig. 1 is a horizontal sectional view of an embodiment of an electrode group according to the invention. Fig. 2 is a diagrammatical plan view of a storage battery cell composed of four electrode groups according to Fig. 1 contained in a common cell tank or can. Fig. 3 is a similar view of a cell, composed of twelve electrode groups contained in a common cell tank or can. Fig. 4 is a vertical sectional view of a double-cell arrangement and Fig. 5 is a plan view thereof.

In the embodiment shown in Fig. 1 the electrodes of different polarity are separated from each other by means of insulating rods $m$. As apparent from the figure, the said rods are preferably so disposed as to bear against the electrodes at those points, where said electrodes, due to the swelling of the mass, has the greatest tendency to bulge out. Obviously, other intermediate members between the electrodes, for instance perforated ebonite plates or the like may be used instead of the rods m. In order to utilize the space inside the cell, the receptacles of those electrodes which have no tendency of swelling, as shown in Fig. 1, may preferably be so shaped as to obtain a concavo-concave form. In assembling an electrode group according to the present invention the desired number of electrodes is preferably piled up in a gauge or the like particularly adapted for the purpose. The electrode group is then clamped between clamping plates and may, if desired, be further pressed together. The electrode group is then introduced into its appertaining pressing device the pressing plates of which are parallel with the electrodes. Said press plates are so devised as to resist the relatively high pressure exerted by the electrodes on account of the above mentioned swelling tendency of the electrodes which begins as soon as the electrode group is brought in contact with the electrolyte. In ordinary storage battery cells in which a deformation of the electrodes is not prevented, it might also happen that the electrodes swell to such an extent that short-circuits occur between the edges of the electrodes of different polarity. In the embodiment shown in Fig. 1, the pressing device consists of the pressing plates $g_1$, $g_1$ and the side walls $g$, $g$. In order to facilitate the construction of pressing plates or gables $g_1$, $g_1$ the lateral width of the electrodes according to the present invention is suitably made smaller than in ordinary storage batteries of corresponding capacity, and accordingly the number of electrodes in a cell according to the invention will generally be greater than in such ordinary cells. The said pressing plates or gables $g_1$, $g_1$ are provided with transversal corrugations or with other reinforcements in the form of impressions or ribs and are preferably made from thicker sheet-metal than the side walls $g$, $g$.

In the manufacture of storage battery cells according to the invention on a commercial scale a common standard width of the electrodes is preferably used for cells of different capacity while the height and the number of electrodes are varied according to the desired capacity. Apart from cells with a relatively small capacity, the electrodes in a storage battery according to the present invention are therefore characterized by small width relatively to the height. Cells of greater capacity therefore obtain a relatively great length as compared with the width. In many cases it is therefore suitable, in order to obtain a desired form of a cell of great capacity, to make up the cell of a number of electrode groups in which case the shape may be varied in different manner, as will be more closely described below.

In connection with the invention it is of importance that the lateral dimension of the electrodes is held within such limits that the required rigidity of the gables $g_1$, $g_1$ is obtained, without using an excessive wall thickness. As an example, it may be mentioned that already a lateral dimension of the electrodes of about 125 mm., which is often used in ordinary storage battery cells, for instance in batteries for electric automobiles having a capacity of about 200 to 300 ampère hours, would generally be found to be excessive in connection with the present invention, as it would then be necessary to use a very great wall thickness of the pressing plates or otherwise to reinforce said plates excessively which would be unsuitable particularly in such cases, where it is of importance to obtain as great a specific capacity of weight or volume as possible.

The side walls $g$, $g$ of the pressing device which are exposed to tension stresses only, may be made from considerably thinner sheetmetal as illustrated in Fig. 1. The vertical edges of the gables $g_1$, $g_1$ are bent out and connected to the side walls $g$, $g$ preferably by welding. The sleeve formed by the pressing device may, if desired, be used as cell casing and may to this end be provided with a bottom and with a cover. The application of the cover and bottom is without particular importance in the present construction and may preferably be performed by welding in known manner.

If, with regard to a simplified manufacturing, a common lateral dimension, for instance 60 mm. is used for cells of different capacity, as above mentioned it might happen in assembling cells of the highest existing capacity, for instance for storage batteries for submarine vessels, that a construction according to the above described art would obtain unsuitable dimensions for the purpose in question. In such cases the pressing device or sleeves consisting of the walls $g_1$, $g_1$, $g$, $g$ (Fig. 1) are made without bottom and cover, and then several electrode groups provided each with its appertaining pressing device are assembled in a common receptacle (the cell casing) provided with bottom and cover. In Fig. 2 is shown an arrangement of this kind comprising four electrode groups according to the above described construction enclosed in a casing $n$, and in Fig. 3 is shown an arrangement comprising twelve electrode groups assembled in a common casing $n$.

In an arrangement of the kind as last mentioned the sleeves forming the pressing device may, if desired, be used as current conductors for the electrodes of the one polarity, in that all electrodes of the same polarity within each group are metallically connected with the sleeve while the electrodes of the opposite polarity are then obviously to be electrically insulated from the sleeves. The sleeves may then if desired, be connected to each other and, if desired, also with the casing $n$. In some cases it may be favourable that the current supply for the electrodes of the one polarity is performed through the medium of the connection of the electrodes to the bottom of the cell casing. The chambers designated with $j$ in Figs. 2 and 3 and located between the electrode groups may be used as containers for conductors, which may, if desired, be insulated from the sleeves surrounding the electrode groups. By such an arrangement also the current supply for the electrodes of each polarity may be disposed at the top as well as at the bottom.

In cells, of smaller capacity in which the required number of electrodes may be assembled in a single group. The sleeve may, as shown in Fig. 1, be formed by the walls of the cell casing. If desired, an additional cell casing may obviously be used, which is in this case preferably insulated on the outside or wholly formed by insulating material and into which the electrode group with its appertaining sleeve is loosely inserted, so as to be easily detachable, for instance for cleansing purposes.

Electrodes of the shape as used in the present case and the arrangement of the same according to the invention is well suited to be used in the construction of so-called double-cells.

Such a double-cell construction known per se and used particularly in connection with alkaline storage batteries with cell casings of conductive material, consists as known, of two cells metallically connected with each other, i. e. in that the electrodes of the one polarity in the one cell and the electrodes of the opposite polarity in the other cell are metallically connected with the casing.

Fig. 4 is a section of such a double cell and Fig. 5 is a top view thereof. Each of the two cells is formed by an electrode group according to the invention. In the embodiment shown in the said figures, the two electrode groups are disposed with the electrodes perpendicular to the common wall between the groups, and the inner connections between electrodes of different polarity are arranged at the bottom of the casing and made for instance by welding, said connections being preferably so disposed that the terminals $k$ will be placed close to the common partition $p$ between the two cells. The terminals $l_1$ and $l_2$ of the free poles are preferably located at the top in the cover of the cell casing as shown. By such an arrangement a practically equal distribution of the current density over the whole surfaces of the electrodes is obtained independently of the magnitude of the load also in electrodes with a considerable height.

What I claim is:—

1. In a storage battery in combination a number of positive electrodes having the active mass enclosed between perforated cover plates and corresponding negative electrodes assembled into a group, intermediate spacing members of insulating material disposed between the electrodes at those points, where the electrodes tend to belly owing to the tendency of swelling of the active mass, a pair of press plates bearing each against one of the outermost electrodes and members connecting said press plates and adapted to take up, through the medium of the spacing members and the press plates, the inner pressure produced by the tendency of swelling.

2. In a storage battery in combination a number of positive electrodes having the active mass enclosed between perforated cover plates and corresponding negative electrodes assembled into a group, intermediate spacing members of insulating material disposed between the electrodes at those points, where the electrodes tend to belly owing to the tendency of swelling of the active mass, a pair of press plates bearing each against one of the outermost electrodes and a pair of sheet metal plates connecting the vertical edges of each of said press plates with the corresponding edges of the other press plate and adapted to take up, through the medium of the spacing members and the press plates, the inner pressure produced by the tendency of swelling.

3. An arrangement according to claim 2, characterized by the press plates being made with a larger wall thickness than the sheet metal plates connecting the vertical edges of said plates.

4. In a storage battery in combination a number of positive electrodes having the active mass enclosed between perforated cover plates and corresponding negative electrodes assembled into a group, spacing members of insulating material disposed between the electrodes at those points where the electrodes tend to belly owing to the tendency of swelling of the active mass, a rectangular sleeve surrounding said group of electrodes, the end walls of said sleeve bearing against the outermost electrodes of the group to take up the inner pressure produced by the tendency of swelling and transferred to said end walls through the medium of the spacing members, said end walls being reinforced so as to resist to the strain of flexure produced by the inner forces.

5. An arrangement according to claim 4, characterized by the sides of the sleeve forming parts of the cell casing.

In testimony whereof I affix my signature.

CARL HILDING OSSIAN LÜBECK.